United States Patent
Priatmoko et al.

(10) Patent No.: US 10,280,242 B2
(45) Date of Patent: May 7, 2019

(54) BIMODAL POLYPROPYLENE FOR CAST FILMS OR A METALLIZED FILM WHEREIN THE POLYPROPYLENE COMPRISES TWO FRACTIONS WHICH DIFFER IN THE COMONOMER CONTENT

(71) Applicants: ABU DHABI POLYMERS CO. LTD (BOROUGE) LLC, Abu Dhabi (AE); BOREALIS AG, Vienna (AT)

(72) Inventors: Joko Priatmoko, Singapore (SG); Vassilios Galiatsatos, Abu Dhabi (AE)

(*) Notice: Subject to any disclaimer, the term of this patent is extended or adjusted under 35 U.S.C. 154(b) by 586 days.

(21) Appl. No.: 14/888,134

(22) PCT Filed: May 28, 2014

(86) PCT No.: PCT/EP2014/061153
§ 371 (c)(1),
(2) Date: Oct. 30, 2015

(87) PCT Pub. No.: WO2014/191506
PCT Pub. Date: Dec. 4, 2014

(65) Prior Publication Data
US 2016/0068624 A1   Mar. 10, 2016

(30) Foreign Application Priority Data
May 29, 2013 (EP) .................................. 13169782

(51) Int. Cl.
| | | |
|---|---|---|
| C08L 23/00 | (2006.01) | |
| C08F 2/60 | (2006.01) | |
| C08F 8/00 | (2006.01) | |
| C08F 210/06 | (2006.01) | |
| C08L 23/14 | (2006.01) | |
| B32B 7/12 | (2006.01) | |
| B32B 27/08 | (2006.01) | |
| B32B 27/32 | (2006.01) | |
| C08J 5/18 | (2006.01) | |

(52) U.S. Cl.
CPC .............. *C08F 210/06* (2013.01); *B32B 7/12* (2013.01); *B32B 27/08* (2013.01); *B32B 27/32* (2013.01); *C08J 5/18* (2013.01); *C08L 23/14* (2013.01); *C08L 23/142* (2013.01); *B32B 2255/10* (2013.01); *B32B 2255/205* (2013.01); *B32B 2307/308* (2013.01); *B32B 2307/31* (2013.01); *B32B 2307/54* (2013.01); *B32B 2307/546* (2013.01); *B32B 2307/558* (2013.01); *B32B 2439/70* (2013.01); *C08J 2323/14* (2013.01); *C08J 2423/06* (2013.01); *C08L 2203/16* (2013.01); *C08L 2205/02* (2013.01); *C08L 2205/025* (2013.01); *C08L 2207/062* (2013.01); *C08L 2308/00* (2013.01)

(58) Field of Classification Search
CPC ............... C08F 210/06; C08L 2203/16; C08L 2207/062; C08L 23/142; C08L 2323/14; C08J 5/18; C08J 2423/06; C08J 2323/14; B32B 2439/70; B32B 27/32; B32B 2307/31
USPC ...... 525/240, 191, 55, 50, 53; 428/515, 500, 428/411.1; 520/1
See application file for complete search history.

(56) References Cited

U.S. PATENT DOCUMENTS

| | | | | |
|---|---|---|---|---|
| 2004/0181024 | A1* | 9/2004 | Nakamura | C08F 10/06 526/348.1 |
| 2005/0113517 | A1* | 5/2005 | Tayano | B32B 27/32 525/191 |
| 2010/0234507 | A1* | 9/2010 | Pezzutti | C08F 210/06 524/396 |

FOREIGN PATENT DOCUMENTS

| | | | | |
|---|---|---|---|---|
| EP | 0 887 379 | A1 | 12/1998 | |
| EP | 1 428 854 | A1 | 6/2004 | |
| EP | 1 829 919 | A1 | 9/2007 | |
| EP | 2 251 361 | A1 | 11/2010 | |
| EP | 2 487 199 | A1 | 8/2012 | |
| EP | 2 487 203 | A1 | 8/2012 | |
| EP | 2487199 | | * 8/2012 | |
| EP | 2487199 | A1 | * 8/2012 | ............ C08F 210/06 |
| EP | 2 527 593 | A1 | 11/2012 | |
| WO | 92/12182 | A1 | 7/1992 | |
| WO | 03/000754 | A1 | 1/2003 | |
| WO | 03/000757 | A1 | 1/2003 | |
| WO | 2004/029112 | A1 | 4/2004 | |
| WO | 2007/077027 | A1 | 7/2007 | |
| WO | 2010/104739 | A2 | 9/2010 | |

OTHER PUBLICATIONS

International Search Report for International Application No. PCT/EP2014/061153, Filed May 28, 2014.

* cited by examiner

*Primary Examiner* — Jessica Whiteley
(74) *Attorney, Agent, or Firm* — Warn Partners, P.C.

(57) ABSTRACT

The present application relates to a propylene ethylene random copolymer exhibiting two melting temperatures ($T_m$) which differ from each other.

18 Claims, 1 Drawing Sheet

Plot of surface tension of the outer surface of the skin layer with the aging time after corona treatment and before deposition of aluminium vapour

BIMODAL POLYPROPYLENE FOR CAST FILMS OR A METALLIZED FILM WHEREIN THE POLYPROPYLENE COMPRISES TWO FRACTIONS WHICH DIFFER IN THE COMONOMER CONTENT

CROSS REFERENCE TO RELATED APPLICATIONS

This application is a National Stage of International Application No. PCT/EP2014/061153, filed May 28, 2014. This application claims priority to European Patent Application No. EP13169782.3 filed on May 29, 2013. The disclosures of the above applications are incorporated herein by reference.

The present invention is directed to a bimodal random propylene copolymer, compositions thereof, the use for making cast films and metallized films and its manufacture.

Films of random propylene copolymer are used in wide areas, e.g. food packaging, such as wrapping films and containers. Such films are known for their well-balanced properties like strength, stiffness, transparency and resistance to impact, among others. Metallized films are also used as a packaging material, for example, in the form of a layered polypropylene film/aluminum foil structure.

Typically, films produced from random polypropylene resins, containing ethylene as a comonomer, possess a single melting point, whose value is inversely proportional to the comonomer concentration. Such a single melting point implies the presence of a uniform population of crystallites that melt around the said melting point. This behavior limits the mechanical and surface properties of the films produced from such a resin, thus in turn limiting its applicability to markets such as food packaging.

Further, films produced from polypropylene resins having a moderate-to-high Xylene Solubles (XS) component cannot be metallized successfully. The presence of low molecular weight, highly atactic material interferes with the metallization process, resulting in poor deposition of the metal layer. The presence of a good metallizable layer is necessary in markets like food packaging.

US 2004/0181024 A1 discloses a random polypropylene copolymer produced in a single reactor with a metallocene catalyst. The resin in the previous art has low XS, a feature deemed critical to film metallizability. Although metallizability of such film is improved, coefficient of friction (COF), machinability, and processability of the film usually are not good enough.

A high COF makes unmodified polypropylene films difficult to be successfully employed in automatic packaging equipment. Therefore, slip additives are traditionally added to the polymer components of the film to lower the COF and provide improved machinability. Most slip additives used to lower the COF of polypropylene films are migratory, such as fatty amides, erucamide and oleamide. The effectiveness of these additives depends upon their ability to migrate to the surface of the film. Additionally, the presence of fatty amides, erucamide and oleamide types of slip additives results in adverse appearance effects on the film surface manifested by an increase in haze, a decrease in gloss and the presence of streaks. Fatty amides, erucamide and oleamide types of slip additives also adversely affect the wettability and adhesion of metal coatings applied to the surface of the film.

Moreover, when terpolymers are used, a cost problem arises because such resins are usually more expensive than polypropylenes containing only one sort of comonomer, in particular only ethylene.

Thus, the object of the present invention is to overcome the drawbacks of the state of the art, i.e. to improve mechanical and surface properties of film made from a resin with single Tm. In particular it is the object to improve heat seal temperature, processability and machinability, and to improve or at least maintain tensile property, stillness, COF, etc. Moreover, it is an object to produce a film that possesses good metallizability, low coefficient of friction (COF), improved machinability and processability. At the same time, cost efficiency of the production processes is improved.

The finding of the present invention is that a propylene ethylene random copolymer which exhibits a bimodal distribution of melting points results in a film with enhanced heat seal temperature, processability, metallizability, and at the same time, improve or maintain good tensile property of the film.

This novel resin, a result of a proprietary bimodal process has two distinct crystallite populations, whose presence affects said mechanical and surface properties of films. In addition, the bimodal propylene ethylene random copolymer has a lower cost as compared with the prior art terpolymer of propylene, ethylene and butene.

It is a further finding of the present invention that a combination of a Ziegler-Natta catalyzed bimodal propylene ethylene random copolymer with a high density polyethylene (HDPE) component produces a film that possesses good metallizability, low coefficient of friction (COF), improved machinability and processability with a relatively low cost. Surprisingly the presence of moderate XS does not impact metallizability in an adverse way.

Accordingly, the present application relates to a propylene ethylene random copolymer (R-PP), having
(a) a melt flow rate $MFR_2$ (230° C.) measured according to ISO 1133 from 5 to 15 g/10 min,
(b) an ethylene content from 1 to 10 wt.-%, based on the weight of the propylene ethylene random copolymer (R-PP), and
(c) exhibiting two melting temperatures (Tm) determined by differential scanning calorimetry (DSC) according to ISO 11357-3 which differ from each other.

Further, the present invention relates to compositions containing said propylene ethylene random copolymer (R-PP), in particular for producing cast films and metallizable films. Moreover, present invention relates to the process of making said propylene ethylene random copolymer (R-PP), compositions and films.

BRIEF DESCRIPTION OF THE DRAWINGS

The present invention will become more fully understood from the detailed description and the accompanying drawings, wherein.

In the following the invention is described in more detail.

The term "random" indicates that the comonomer ethylene of the propylene ethylene random copolymer (R-PP) is randomly distributed within the propylene copolymer. The term random is understood according to IUPAC (Glossary of basic terms in polymer science; IUPAC recommendations 1996).

The term "propylene ethylene random copolymer" indicates that the copolymer consist of two monomer units only, namely the propylene and ethylene unit. In other words the propylene ethylene random copolymer according to this invention contains no further comonomers and thus terpolymers are excluded. Further the term "propylene ethylene random copolymer" according to this invention excludes all heterophasic systems. In other words the propylene ethylene random copolymer according to this invention does not comprise an elastomeric phase.

The propylene ethylene random copolymer (R-PP) exhibits two melting temperatures ($T_m$). The melting temperature ($T_m$) is determined by differential scanning calorimetry (DSC) according to ISO 11357-3.

It is believed that the bimodal melting temperature ($T_m$) arises from two distinct crystallite populations within the propylene ethylene random copolymer (R-PP).

The propylene ethylene random copolymer (R-PP) may further comprise additives however, this is described further below.

Hence, a first embodiment of the present invention is described as a propylene ethylene random copolymer (R-PP), having
(a) a melt flow rate $MFR_2$ (230° C.) measured according to ISO 1133 from 5 to 15 g/10 min,
(b) an ethylene content from 1 to 10 wt.-%, and
(c) exhibiting two melting temperatures ($T_m$) determined by differential scanning calorimetry (DSC) according to ISO 11357-3 which differ from each other.

Preferably, the higher melting temperature ($T_m$) differs from the lower melting temperature ($T_m$) by at least 4° C., more preferably in the range from 5 to 40° C., more preferably from 5 to 20° C., still more preferably in the range from 5 to 15° C.

For instance, the higher melting temperature ($T_m$) may range from 142 to 165° C., preferably from 142 to 155° C., more preferably from 146 to 152° C.

For instance, the lower melting temperature ($T_m$) may range from 125 to below 141° C., preferably from 130 to below 141° C., more preferably from 137 to 141° C.

It is however preferred that the melting temperatures ($T_m$) differ from each other by at least 4° C.

The xylene cold soluble (XCS) content of the propylene ethylene random copolymer (R-PP) is preferably equal or below 12 wt.-%, more preferably equal or below 10 wt.-%, still more preferably in the range from 1.0 to 9.0 wt.-%, like in the range from 2.0 to 8.0 wt.-%. The weight percentage is based on the total weight of the propylene ethylene random copolymer (R-PP).

The amount of xylene cold solubles (XCS) indicates that the propylene ethylene random copolymer (R-PP) is preferably free of any elastomeric polymer component, like an ethylene propylene rubber. In other words, the propylene ethylene random copolymer (R-PP) shall be not a heterophasic polypropylene, i.e. a system consisting of a polypropylene matrix in which an elastomeric phase is dispersed in form of inclusions. Such systems are featured by a rather high xylene cold soluble content.

The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene ethylene random copolymer (R-PP) according to this invention has no glass transition temperature below −30° C., preferably below −25° C., more preferably below −20° C.

In one embodiment, the propylene ethylene random copolymer (R-PP) comprises a propylene ethylene random copolymer fraction (R-PP1) and a propylene ethylene random copolymer fraction (R-PP2) in a weight ratio [(R-PP1)/(R-PP2)] of 30/70 to 70/30, wherein (d) the ethylene content of the propylene ethylene random copolymer fraction (R-PP1) is equal to or differs from the ethylene content of the propylene ethylene random copolymer fraction (R-PP2).

Hence, the invention encompasses further an embodiment of a propylene ethylene random copolymer (R-PP), having
(a) a melt flow rate $MFR_2$ (230° C.) measured according to ISO 1133 from 5 to 15 g/10 min,
(b) an ethylene content from 1 to 10 wt.-%,
(c) exhibiting two melting temperatures ($T_m$) determined by differential scanning calorimetry (DSC) according to ISO 11357-3 which differ from each other, and whereby the propylene ethylene random copolymer (R-PP) comprises a propylene ethylene random copolymer fraction (R-PP1) and a propylene ethylene random copolymer fraction (R-PP2) in a weight ratio [(R-PP1)/(R-PP2)] of 30/70 to 70/30, wherein (d) the ethylene content of the propylene ethylene random copolymer fraction (R-PP1) is equal to or differs from the ethylene content of the propylene ethylene random copolymer fraction (R-PP2).

The propylene ethylene random copolymer (R-PP) according to the present invention comprises, preferably comprises as only polymer components, more preferably consists of, 30 to 70 wt.-% of R-PP1, preferably 30 to 60 wt % of R-PP1, more preferably 40 to 50 wt % of R-PP1, and 70 to 30 wt.-% of R-PP2, preferably 60 to 40 wt %, more preferably 60 to 50 wt % of R-PP2.

The propylene ethylene random copolymer (R-PP) has a melt flow rate $MFR_2$ (230° C.) measured according to ISO 1133 in the range from 5 to 15 g/10 min, more preferably from 5 to 11 g/10 min, still more preferably in the range from 7 to 9 g/10 min.

In one preferred embodiment, the melt flow rate $MFR_2$ (230° C.) measured according to ISO 1133 of both fractions, R-PP1 and R-PP2, is about the same.

In another embodiment, the melt flow rate $MFR_2$ (230° C.) measured according to ISO 1133 of fraction R-PP1 differs from that of fraction R-PP2, such as by 0.1 to 5.0 g/10 min, preferably 0.1 to 3.0 g/10 min The propylene ethylene random copolymer (R-PP) according to the present invention has preferably a total ethylene content in the range from 1 to 10 wt.-%, more preferably in the range from 1.6 to 8.2 wt.-%, even more preferably in the range from 1.6 to 6 wt-%, and most preferably from 2 to 6 wt-%. The weight percentage is based on the total weight of random propylene copolymer (R-PP).

The propylene ethylene random copolymer (R-PP) comprises two propylene ethylene random copolymer fractions R-PP1 and R-PP2 which differ from or equal to each other in their comonomer content, i.e. their ethylene content. Preferably, their ethylene content differs by 0 to 5 wt.-%. For instance, the ethylene content of the propylene ethylene random copolymer fraction (R-PP1) differs from the ethylene content of the propylene ethylene random copolymer fraction (R-PP2) within a range from 0 to 2.55 wt.-%, or preferably within a range from 0 to 1.45 wt.-%, or preferably from 0.36 to 1.45 wt.-%.

In one embodiment, one fraction, R-PP1, has an ethylene content ranging from 1 to 8 wt.-%, more preferably in the range from 1.0 to 6 wt.-%, even more preferably in the range from 1.6 to 4.0 wt-%, based on the weight of R-PP1.

The other fraction, R-PP2, then has an ethylene content ranging of 1-10 wt.-%, more preferably in the range of 1-8 wt.-%, even more preferably in the range of 1.6-6.0 wt.-%, based on the weight of R-PP2.

The xylene cold soluble (XCS) content of the propylene ethylene random copolymer fraction (PP1) having the lower ethylene comonomer content is preferably equal or below 10 wt.-%, more preferably equal or below 8 wt.-%, like in the range from 2 to 8.0 wt.-%, like in the range from 2.8 to 6.0 wt.-%. The weight percentage is based on the total weight of the propylene ethylene random copolymer fraction (PP1).

The xylene cold soluble (XCS) content of the propylene ethylene random copolymer fraction (PP2) is preferably equal or below 12 wt.-%, like in the range from 2.0 to 12 wt.-%, like in the range from 2.8 to 11.5 wt.-%, for example in the range from 3.5 to 9.0 wt.-%. The weight percentage is based on the total weight of the propylene ethylene random copolymer fraction (PP2).

In a preferred embodiment the propylene ethylene random copolymer (R-PP) is non-visbroken. As known by the person skilled in the art visbraking can be achieved e.g. by the use of peroxide.

As it is believed that the bimodal melting temperature ($T_m$) arises from two distinct crystallite populations within the propylene ethylene random copolymer (R-PP), the invention can also be described in relation to the production process. Hence, another embodiment of the invention relates to a propylene ethylene random copolymer (R-PP) according to anyone of the preceding embodiments, obtainable by a sequential polymerization process comprising at least two reactors connected in series, wherein said process comprises the steps of
(A) polymerizing in a first reactor (R-1) propylene and ethylene, and obtaining said propylene ethylene random copolymer fraction (R-PP1),
(B) transferring said propylene ethylene random copolymer fraction (R-PP1) and unreacted comonomers from the first reactor into a second reactor (R-2),
(C) feeding to said second reactor (R-2) propylene and ethylene,
(D) polymerizing propylene and ethylene in said second reactor (R-2) and in the presence of said propylene ethylene random copolymer fraction (R-PP1), and obtaining said propylene ethylene random copolymer fraction (R-PP2), i.e. said propylene ethylene random copolymer (R-PP) comprising the propylene ethylene random copolymer fraction (R-PP1) and propylene ethylene random copolymer fraction (R-PP2),
wherein further
(i) the temperature in the first reactor (R-1) is preferably of more than 65° C. to equal or below 95° C., more preferably of more than 70° C. to equal or below 90° C.,
(ii) the temperature in the second reactor (R-2) is preferably of equal or more than 75° C. to equal or below 100° C., more preferably of equal or more than 80° C. to equal or below 95° C.,
(iii) in the first reactor (R-1) and second reactor (R-2) the polymerization takes place in the presence of a solid catalyst system (SCS) having a surface area measured according to ASTM D 3662 of less than 30 m²/g,
wherein further
(I) said solid catalyst system (SCS) comprises
(Ia) a transition metal selected from one of the groups 4 to 6 of the periodic table (IUPAC),
(Ib) a metal which is selected from one of the groups 1 to 3 of the periodic table (IUPAC), and
(Ic) an internal electron donor (ID).

The phrase "anyone of the preceding embodiments" of propylene ethylene random copolymer (R-PP) as described above in this context means that any limitation of the above embodiments, be it in respect of the melt flow rate MFR2 (230° C.), the melt temperatures (Tm) and/or the XCS, as well as the total ethylene content or the ethylene content of each of its fractions, or their manufacture is to be regarded as explicitly encompassed and disclosed within this specification.

A further embodiment of the present invention relates to the propylene ethylene random copolymer (R-PP) according to anyone of the embodiments and combinations as described above for the manufacture of cast films.

A further embodiment of the invention relates to the propylene ethylene random copolymer (R-PP) according to anyone of the embodiments and combinations as described above for the manufacture of metallizable films.

A further embodiment of the present invention relates to a cast film comprising the random propylene copolymer (R-PP) according to anyone of the embodiments and combinations thereof as described above.

The phrase "anyone of the embodiments and combinations" of propylene ethylene random copolymer (R-PP) as described above in this context means that any limitation of the above embodiments, be it in respect of the melt flow rate $MFR_2$ (230° C.), the melt temperatures ($T_m$) and/or the XCS, as well as the total ethylene content or the ethylene content of each of its fractions, or their manufacture is to be regarded as explicitly encompassed and disclosed within this specification.

Moreover, the propylene ethylene random copolymer (R-PP) for the preparation of the cast film may contain additives known in the art, like antioxidants, acid scavengers, nucleating agents, antiblocking agents, and antistatic agents. Typically the composition may contain no more than 5.0 wt %, yet more preferably not more than 3.0 wt %, like not more than 2.0 wt % of additives mentioned herein.

Preferred additives are antiblocking agents, antioxidants, and/or acid scavengers as set out in more detail below.

A further embodiment of the present invention relates to a polypropylene composition comprising
(a) 99 to 90 wt.-% of the propylene ethylene random copolymer (R-PP) according to anyone of the embodiments and combinations thereof as described above,
(b) 1 to 10 wt.-% of a high density polyethylene (HDPE) having a melt flow rate $MFR_2$ (190° C.) of 15 to 45 g/10 min and a density of at least 940 kg/m³, and
(c) optionally additives, for example acid scavengers, antioxidants and/or antiblocking agents,
based on the weight of the composition.

In the composition, HDPE can be replaced partly or entirely with one or more of polyolefin elastomer, MAH (maleic anhydride) modified polypropylene, and polyethylene.

The phrase "anyone of the embodiments and combinations" of propylene ethylene random copolymer (R-PP) as described above in this context means that any limitation of the above embodiments, be it in respect of the melt flow rate $MFR_2$ (230° C.), the melt temperatures ($T_m$) and/or the XCS, as well as the total ethylene content or the ethylene content of each of its fractions, or their manufacture is to be regarded as explicitly encompassed and disclosed within this specification.

Preferably, the amount of the propylene ethylene random copolymer (R-PP) is 99 to 90 wt.-%, more preferably it is 98 to 92 wt.-%, even more preferably 97 to 94 wt.-%.

Preferably, the amount of high density polyethylene (HDPE) is 1 to 10 wt.-%, more preferably it is 1.5 to 7 wt.-%, even more preferably 2.5 to 4.0 wt.-%.

The addition of HDPE into the composition is particularly preferred and necessary for the manufacture of a metallizable skin layer in the production of a metallizable film. It is to be understood that the term "skin layer" refers to an outer layer or surface of the film which will be metallized. Hence, in case the metallizable film is a monolayer, said monolayer shall comprise the above composition, comprising the said HDPE.

High Density Polyethylene (HDPE)

The polyethylene (PE) used according to the present invention is crystalline and not soluble in cold xylene, i.e. the solubility in xylene is 2% or less. In a preferred embodiment the polyethylene (PE) is a high density polyethylene (HDPE). The high density polyethylene (HDPE) used according to the invention is well known in the art and commercially available.

The high density polyethylene (HDPE) preferably has a melt flow rate $MFR_2$ (190° C.) of 15 to 45 g/10 min, preferably 20 to 40 g/10 min, more preferably of 25 to 35 g/10 min.

The high density polyethylene (HDPE) typically has a density of at least 940 $kg/m^3$, preferably of at least 945 $kg/m^3$, more preferably at least 955 $kg/m^3$, still more preferably in the range of 945 to 970 $kg/m^3$, yet more preferably in the range of 950 to 965 $kg/m^3$.

In one embodiment, it is preferred that no high density polyethylene (HDPE) is present. Such embodiment is particularly suitable for preparing cast films according to present invention.

In another embodiment, it is preferred that a high density polyethylene (HDPE) is present. Such embodiment is particularly suitable for preparing metallized films. The metallizable film may preferably be a cast film.

The polyethylene (PE), i.e. the high density polyethylene (HDPE), is pelletized together with the random propylene copolymer (R-PP) for formulating the composition for preparing a metallizable film.

Additives

The propylene ethylene random copolymer composition may contain additives known in the art, like antioxidants, acid scavengers, nucleating agents, antiblocking agents, and antistatic agents. Typically the composition may contain no more than 5.0 wt %, yet more preferably not more than 3.0 wt %, like not more than 2.0 wt % of additives mentioned herein.

In one embodiment of the invention, the polypropylene composition comprises 0.1 to 5.0 wt % of one or more additives selected from the group of an antiblocking agent (AB), an antioxidant, an acid scavenger, a nucleating agent, and/or an antistatic agent. Preferred additives are antiblocking agents, antioxidants, and/or acid scavengers.

A further embodiment prefers antiblocking agents, antioxidants and/or acid scavengers, but is free of slip agents.

The coefficient of friction (COF) is a measure of the relative difficulty with which one surface will slide over the adjoining surface. The greater the resistance to sliding, the higher is the coefficient of friction (COF) value.

It is to be understood that the addition of an additive is common in the art. Hence, it is to be regarded as disclosed and known to the skilled person that any of the herein mentioned additives, in the amounts mentioned herein, may be singularly or in combination with others added to any of the polypropylene compositions and combinations disclosed herein.

Antioxidants are commonly used in the art, examples are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS-no. 11097-59-9), lactates and lactylates, as well as calcium and zinc stearates.

Common antiblocking agents are natural silica such as diatomaceous earth (such as CAS-no. 60676-86-0 (SuperfFloss™), CAS-no. 60676-86-0 (SuperFloss E™), or CAS-no. 60676-86-0 (Celite 499™)), synthetic silica (such as CAS-no. 7631-86-9, CAS-no. 7631-86-9, CAS-no. 7631-86-9, CAS-no. 7631-86-9, CAS-no. 7631-86-9, CAS-no. 7631-86-9, CAS-no. 112926-00-8, CAS-no. 7631-86-9, or CAS-no. 7631-86-9), silicates (such as aluminum silicate (Kaolin) CAS-no. 1318-74-7, sodium aluminum silicate CAS-no. 1344-00-9, calcined kaolin CAS-no. 92704-41-1, aluminum silicate CAS-no. 1327-36-2, or calcium silicate CAS-no. 1344-95-2), synthetic zeolites (such as sodium calcium aluminosilicate hydrate CAS-no. 1344-01-0, CAS-no. 1344-01-0, or sodium calcium aluminosilicate, hydrate CAS-no. 1344-01-0)

Especially preferred is that the antiblocking agent (AB) is a silicon dioxide and/or silicate. Preferably the antiblocking agent (AB) is a silicon dioxide ($SiO_2$), like a synthetic silicon dioxide. Typically the silicon dioxide has pore volume in the range of 0.8 to 1.2 ml/g and/or a particle size of 3.5 to 6.0 μm.

Nucleating agents are also known in the art. They may be selected from the group of benzoates, such as sodium or lithium benzoate, sorbitol compounds, such as 2,4 di(methylbenzylidene) sorbitol, phosphorous-based compounds such as sodium di(4-tert. butylphenol)phosphate, but also beta-nucleators such as N,N'-dicyclohexyl-2,6-naphtalene dicarboxyamide, rosins such as calcium resinate, and others such as talc.

Antistatic agents are known in the art as well. They may be selected from the group of glyceryl esters such as CAS-no. 97593-29-8, CAS-no. 97593-29-8, or CAS-no. 97593-29-8, ethoxylated amines such as Hostastat FA 18™ from Clariant, ethoxylated amides such as N,N-bis(2-hydroxyethyl) dodecanamide, permanent antistats such as Irgastat™ grades from BASF, or sorbitan based products such as sorbitan monooleate.

A further embodiment of the present invention relates to a metallizable film comprising the polypropylene composition according to the above described embodiment, i.e. the polypropylene composition comprising (a) 99 to 90 wt.-% of the propylene ethylene random copolymer (R-PP) according to anyone of the embodiments and combinations thereof as described above, (b) 1 to 10 wt.-% of a high density polyethylene (HDPE) having a melt flow rate MFR2 (190° C.) of 15 to 45 g/10 min and a density of at least 940 $kg/m^3$, and (c) optionally additives, for example acid scavengers, antioxidants and/or antiblocking agents, but preferably being free of slip agent(s);

based on the weight of the composition.

In the composition, HDPE can be replaced partly or entirely with one or more of polyolefin elastomer, MAH modified PP, and polyethylene wax.

All limitations and combinations of the above-described embodiment are herewith regarded as disclosed in combination with the metallizable film.

A further embodiment of the invention relates to the use of the propylene ethylene random copolymer (R-PP) for the preparation of cast films.

Another embodiment of the invention relates to the use of the propylene propylene ethylene random copolymer (R-PP) for the preparation of metallizable cast films. The metallizable film may preferably be a cast film.

Another embodiment of the invention relates to the use of the propylene ethylene random copolymer (R-PP) for the preparation of polypropylene compositions suitable for the preparation of cast films and/or metallizable cast films.

Thereby, the cast films or metallizable cast films may be monolayer, bilayer, triple layer or multilayer films. The core layer of such films may be a homo polypropylene having a melt flow rate (230° C./2.16 kg) from 6 to 12 g/10 min, preferably from 6 to 10 g/10 min. The melting temperature is preferably higher than that of the coating propylene ethylene random copolymer (R-PP).

The advantageous properties of the present propylene ethylene random copolymer (R-PP), namely the two different melting temperatures ($T_m$), or bimodal melting temperature ($T_m$), are particularly important for the heat sealing properties needed for the manufacture of the films, preferably cast films. The two melting temperatures ($T_m$) allow for a lower heat sealing temperature, which is of advantage for the film production and processing. Simultaneously, the tensile modulus and tensile strength are high.

Important for the metallizable film is the skin layer. Most preferably, the skin layer comprises the polypropylene composition according to the above described embodiment, i.e. the polypropylene composition comprising (a) 99 to 90 wt.-% of the propylene ethylene random copolymer (R-PP) according to anyone of the embodiments and combinations thereof as described above, (b) 1 to 10 wt.-% of a high density polyethylene (HDPE) having a melt flow rate $MFR_2$ (190° C.) of 15 to 45 g/10 min and a density of at least 940 kg/m³, and (c) optionally additives, for example acid scavengers, antioxidants and/or antiblocking agents, but preferably being free of slip agent(s);

based on the weight of the composition.

The skin layer comprising the composition has a good metalliability even though the propylene ethylene random copolymer (R-PP) has a moderate xylene soluble content.

Preparation of the Propylene Ethylene Random Copolymer (R-PP)

The instant propylene ethylene random copolymer (R-PP) is produced in a sequential polymerization process. The term "sequential polymerization process" indicates that the random propylene copolymer (R-PP) is produced in at least two reactors connected in series. More precisely the "term sequential polymerization process" indicates in the present application that the polymer of the first reactor (R-1), i.e. the propylene ethylene random copolymer fraction R-PP1, is directly conveyed with unreacted comonomers to the second reactor (R-2) in which the propylene ethylene random copolymer fraction R-PP2 is produced. Accordingly, a decisive aspect of the present process is the preparation of the propylene ethylene random copolymer (R-PP) in two different reactors, wherein the reaction material of the first reactor (R-1) is directly conveyed to the second reactor (R-2), and thus the propylene ethylene random copolymer (R-PP) comprises two different fractions, namely R-PP1 and R-PP2. Accordingly the present process comprises at least a first reactor (R-1) and a second reactor (R-2). In one specific embodiment the instant process consists of two the polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors. In case of comprising a pre-polymerization reactor, R-PP1 means the sum of copolymers produced in the pre-polymerization reactor and the first polymerization reactor (R-1).

The first reactor (R-1) is preferably a slurry reactor (SR) and can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and any subsequent reactor are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Preferably in the first reactor (R-1), preferably in the slurry reactor (SR), like in the loop reactor (LR), the temperature is more than 65° C., preferably equal or more than 68° C., still more preferably in the range of equal or more than 65° C. to equal or below 95° C., still more preferably in the range of equal or more than 65° C. to equal or below 90° C., more preferably in the range of 65-80° C., and more preferably in the range of 70-75° C.

The pressure in the first reactor (R-1), preferably in the slurry reactor (SR), like in the loop reactor (LR), is within the range of 25 bar to 80 bar, preferably between 30 bar to 70 bar, more preferably 40 to 60 bar. Hydrogen can be added for controlling the molar mass in a manner known per se.

Subsequently, the reaction mixture from the first reactor (R-1) is transferred to the second reactor (R-2), i.e. to the gas phase reactor (GPR-1), whereby the temperature in the second reactor (R2) is preferably within the range of equal or more than 75° C. to 100° C., more preferably within the range of equal or more than 80° C. to 95° C., more preferably 80-90° C.

Further it is preferred that in the second reactor (R-2), preferably in the gas phase reactor (GPR-1), the pressure is within the range of 5 bar to 50 bar, preferably between 15 bar to 40 bar, more preferably 20 to 30 bar. Hydrogen can be added for controlling the molar mass in a manner known per se.

The residence time can vary in both reactor zones.

In one embodiment of the process for producing propylene copolymer (R-PP) the residence time in bulk reactor, e.g. loop, is in the range 0.2 to 4 hours, e.g. 0.3 to 1.5 hours, more preferably in the range of 0.6 to 1.5 h, and the residence time in gas phase reactor (GPR) will generally be 0.2 to 6.0 hours, like 0.5 to 4.0 hours, more preferably 1 to 1.9 h.

The conditions in the other gas phase reactors (GPR), if present, are similar to the second reactor (R-2).

Especially good results are achievable by the present process in case the instant process encompass a pre-polymerization (P) prior to the polymerization in the first reactor (R-1). The pre-polymerization (P) can be conducted in the first reactor (R-1), however it is preferred that the pre-polymerization (P) takes place in a separate reactor, so called pre-polymerization reactor (P-R). A pre-polymerization reactor is of smaller size compared to the first (R-1) and second (R-2) reactor, respectively. Preferably, the reaction volume of the pre-polymerization reactor (P-R) will be between 5% and 30% of the reaction volume of the first reactor (R-1), like the loop reactor. In said pre-polymerization reactor (P-R), the pre-polymerization (P) is performed in bulk or slurry as defined for the first reactor (R-1) above.

Further it is appreciated that the pre-polymerization temperature is rather low, i.e. equal or below 50° C., more preferably between equal or more than 10° C. to equal or below 50° C., yet more preferably between 12 to 45° C., even more preferably between 15 to 40° C., like between 18 and 35° C.

The pressure during pre-polymerization can be between 20 to 80 bar, preferably between 25 to 75 bar, like 30 to 70 bar, or 30-50 bar. Residence times can vary between 0.1 to 1.5 hours, like between 0.2 and 0.8 hours.

Accordingly the present invention is directed to a process for the preparation of a propylene ethylene random copolymer (R-PP) comprising a propylene ethylene random copolymer fraction (R-PP1) and a propylene ethylene random copolymer fraction (R-PP2), said process is a sequential polymerization process comprising at least two reactors connected in series, wherein said process comprises the steps of
(A) polymerizing in a first reactor (R-1) propylene and ethylene, and obtaining said propylene ethylene random copolymer fraction (R-PP1),
(B) transferring said propylene ethylene random copolymer fraction (R-PP1) and unreacted comonomers from the first reactor into a second reactor (R-2),
(C) feeding to said second reactor (R-2) propylene and ethylene,
(D) polymerizing propylene and ethylene in said second reactor (R-2) and in the presence of said propylene ethylene random copolymer fraction (R-PP1), and obtaining said propylene ethylene random copolymer fraction (R-PP2), i.e. said propylene ethylene random copolymer (R-PP) comprising the propylene ethylene random copolymer fraction (R-PP1) and propylene ethylene random copolymer fraction (R-PP2),
wherein further
(i) the temperature in the first reactor (R-1) is preferably of more than 65° C. to equal or below 95° C., more preferably of more than 70° C. to equal or below 90° C.,
(ii) the temperature in the second reactor (R-2) is preferably of equal or more than 75° C. to equal or below 100° C., more preferably of equal or more than 80° C. to equal or below 95° C.,
(iii) in the first reactor (R-1) and second reactor (R-2) the polymerization takes preferably place in the presence of a solid catalyst system (SCS) having a surface area measured according to ASTM D 3662 of less than 30 m²/g
wherein further
(I) said solid catalyst system (SCS) comprises
  (Ia) a transition metal selected from one of the groups 4 to 6 of the periodic table (IUPAC),
  (Ib) a metal which is selected from one of the groups 1 to 3 of the periodic table (IUPAC), and
  (Ic) an internal electron donor (ID),
and
(II) said propylene copolymer (R-PP) has
  (Ia) has a melt flow rate $MFR_2$ (230° C.) measured according to ISO 1133 from 5 to 15 g/10 min,
  (IIb) has an ethylene content from 1 to 10 wt.-% and
  (IIc) exhibits two melting temperatures (Tm) determined by differential scanning calorimetry (DSC) according to ISO 11357-3 which differ from each other.

Further preferred features of the propylene copolymer (R-PP) can be taken from the information provided above.

A further embodiment of the invention relates to the propylene ethylene random copolymer (R-PP) produced by the above process.

Solid Catalyst System (SCS)

As indicated above, one further important aspect of the present invention is that a specific catalyst system must be used in the instant polymerization process.

The solid catalyst system (SCS) used comprises
(a) a transition metal selected from one of the groups 4 to 6, in particular of group 4 of the periodic table (IUPAC), preferably Ti,
(b) a metal which is selected from one of the groups 1 to 3 of the periodic table (IUPAC), preferably Mg,
(c) an internal electron donor (ID),
(d) optionally a cocatalyst, like an aluminum compound, and
(e) optionally an external donor, like an organo silane compound, especially an hydrocarbyloxy silane compound.

The metal is preferably brought in the solid catalyst system (SCS) as a metal compound (CM) which forms with the internal electron donor (ID) or its precursor (P-ID) a complex (C). In turn the transition metal is preferably brought in the solid catalyst system (SCS) as a transition metal compound (CT). Further information concerning this matter is provided below.

A remarkable feature of the used catalyst system (SCS) is that it is of solid form. In other words for the random propylene copolymer (R-PP) polymerization an heterogeneous catalysis is applied, i.e. the aggregate state (solid state) of the catalyst system (SCS) differs from the aggregate state of the reactants, i.e. the propylene and other α-olefins used. Different to known solid catalyst systems, the catalyst system (SCS) used in the present invention is a so-called self-supported catalyst system, or in other words the solid catalyst system (SCS) used does not comprise in significant amounts catalytically inert material used normally as support material. Inert support material according to this invention is any material which is used to decrease solubility of the catalyst systems in media which are generally used in polymerization processes as well in common solvents like pentane, heptane and toluene. Typical inert support materials are organic and inorganic support materials, like silica, $MgCl_2$ or porous polymeric material. These support materials are generally used in amounts of at least 50 wt.-%, more preferably of at least 70 wt.-%. Accordingly in the preparation of the solid catalyst system (SCS) used in the present invention, no external support material is used and thus the amount of such an inert support material within the solid catalyst system (SCS) is of not more than 10.0 wt.-%, yet more preferably below 5.0 wt.-%, yet more preferably not detectable.

Typically the solid catalyst system (SCS) has a surface area measured according to the commonly known BET method with $N_2$ gas as analysis adsorptive (ASTM D 3663) of less than 30 $m^2/g$, e.g. less than 20 $m^2/g$. In some embodiments the surface area is more preferably of less than 15 $m^2/g$, yet more preferably of less than 10 $m^2/g$. In some other embodiments, the solid catalyst system shows a surface area of 5 $m^2/g$ or less, which is the lowest detection limit with the methods used in the present invention.

The solid catalyst particle (SCS) can be additionally or alternatively defined by the pore volume measured according to ASTM 4641. Thus it is appreciated that the solid catalyst particle (SCS) has a pore volume of less than 1.0 ml/g. In some embodiments the pore volume is more preferably of less than 0.5 ml/g, still more preferably of less than 0.3 ml/g and even less than 0.2 ml/g. In another preferred embodiment the pore volume is not detectable when determined according to ASTM 4641.

Moreover the solid catalyst particle (SCS) typically has a mean particle size of not more than 500 µm, i.e. preferably in the range of 2 to 500 µm, more preferably 5 to 200 µm. It is in particular preferred that the mean particle size is below 80 µm, still more preferably below 70 µm. A preferred range for the mean particle size is 5 to 80 µm, more preferred 10 to 60 µm.

The solid catalyst system (SCS) is preferably obtainable, i.e. obtained, by a process comprising contacting
(a) a solution of a complex (C) of a metal which is selected from one of the groups 1 to 3 of the periodic table (IUPAC) and an internal electron donor (ID), said complex (C) is obtained by reacting a compound (CM) of said metal with said internal electron donor (ID) or a precursor (P-ID) thereof,
with
(b) a liquid transition metal compound (CT) or a solution of a transition metal compound (CT).

Accordingly one important aspect of the preparation of the solid catalyst system is that neither the complex (C) nor the transition metal compound (CT) are present in solid form during the solid catalyst system (SCS) preparation, as it is the case for supported catalyst systems.

The solution of a complex (C) of the metal which is selected from one of the groups 1 to 3 of the periodic table (IUPAC) and the internal electron donor (ID) is obtained by reacting a compound (CM) of said metal with said internal electron donor (ID) or a precursor (P-ID) thereof in an organic solvent.

The metal compound (CM) used for the preparation of the complex (C) may be any metal compound (CM) which is selected from one of the groups 1 to 3 of the periodic table (IUPAC). However it is preferred that the complex (C) is a Group 2 metal complex, even more preferred a magnesium complex. Accordingly it is appreciated that the metal compound (CM) used in the preparation of said complex (C) is a Group 2 metal compound, like a magnesium compound.

Thus first a metal compound (CM) which is selected from one of the groups 1 to 3 of the periodic table (IUPAC), preferably from a Group 2 metal compound, like from a magnesium compound, containing preferably an alkoxy moiety is produced. More preferably the metal compound (CM) to be produced is selected from the group consisting of a Group 2 metal dialkoxide, like magnesium dialkoxide, a complex containing a Group 2 metal dihalide, like magnesium dihalide, and an alcohol, and a complex containing a Group 2 metal dihalide, like magnesium dihalide, and a Group 2 metal dialkoxide, like magnesium dialkoxide.

Thus the metal compound (CM) which is selected from one of the groups 1 to 3 of the periodic table (IUPAC), preferably from the Group 2 metal compound, like from the magnesium compound, is usually titaniumless.

Most preferably, the magnesium compound is provided by reacting an alkyl magnesium compound and/or a magnesium dihalide with an alcohol. Thereby, at least one magnesium compound precursor, selected from the group consisting of a dialkyl magnesium $R_2Mg$, an alkyl magnesium alkoxide RMgOR, wherein each R is an identical or a different $C_1$ to $C_{20}$ alkyl, and a magnesium dihalide $MgX_2$, wherein X is a halogen, is reacted with at least one alcohol, selected from the group consisting of monohydric alcohols R'OH and polyhydric alcohols $R'(OH)_m$, wherein R' is a $C_1$ to $C_{20}$ hydrocarbyl group and m is an integer selected from 2, 3, 4, 5 and 6, to give said magnesium compound (CM). R' is the same or different in the formulas R'OH and $R'(OH)_m$. The R of the dialkyl magnesium is preferably an identical or different $C_4$ to $C_{12}$ alkyl. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Typical alkyl-alkoxy magnesium compounds are ethyl magnesium butoxide, magnesium dibutoxide, butyl magnesium pentoxide, magnesium dipentoxide, octyl magnesium butoxide and octyl magnesium octoxide. Most preferably, one R is a butyl group and the other R of $R_2Mg$ is an octyl group, i.e. the dialkyl magnesium compound is butyl octyl magnesium.

The alcohol used in the reaction with the magnesium compound precursor as stated in the previous paragraph is a monohydric alcohol, typically $C_1$ to $C_{20}$ monohydric alcohols, a polyhydric (by definition including dihydric and higher alcohols) alcohol or a mixture of at least one monohydric alcohol and at least one polyhydric alcohol. Magnesium enriched complexes can be obtained by replacing a part of the monohydric alcohol with the polyhydric alcohol. In one embodiment it is preferred to use one monohydric alcohol only.

Preferable monohydric alcohols are those of formula R'OH in which R' is a $C_2$ to $C_{16}$ alkyl group, most preferably a $C_4$ to $C_{12}$ alkyl group, like 2-ethyl-1-hexanol.

Typical polyhydric alcohols are ethylene glycol, propene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, glycerol, trimethylol propane and pentaerythritol. Most preferably the polyhydric alcohol is selected from the group consisting of ethylene glycol, 2-butyl-2-ethyl-1,3-propanediol and glycerol.

The reaction conditions used to obtain the metal compound (CM) which is selected from one of the groups 1 to 3 of the periodic table (IUPAC), preferably the metal compound (CM) of Group 2, even more preferred the magnesium compound, may vary according to the used reactants and agents. However according to one embodiment of the present invention, said magnesium compound precursor is reacted with said at least one alcohol at temperature of 30 to 80° C. for 10 to 90 min, preferably about 30 min.

After having obtained the metal compound (CM) which is selected from one of the groups 1 to 3 of the periodic table (IUPAC), preferably the metal compound of Group 2, even more preferred the magnesium compound, said compound (CM) is further reacted with an internal electron donor (ID) or electron donor precursor (P-ID). The internal electron donor (ID) is preferably a mono- or diester of a carboxylic acid or diacid, the latter being able to form a chelate-like structured complex, preferably a mono- or diester of an aromatic carboxylic acid or diacid. Said carboxylic acid ester or diester, preferably the mono- or diester of the aromatic carboxylic acid or diacid, can be formed in situ by reaction of an carboxylic acid halide or diacid halide, i.e. a preferred internal electron donor precursor (P-ID), with a $C_2$-$C_{16}$ alkanol and/or diol. Preferably said metal compound (CM) reacts with an internal electron donor precursor (P-ID), i.e. with a dicarboxylic acid dihalide having preferably the formula (I)

wherein
each R" is an identical or different $C_1$ to $C_{20}$ hydrocarbyl group or both R"s form together with the two unsaturated carbons seen in the formula (I) a $C_5$ to $C_{20}$ aliphatic or aromatic ring, and
X' is a halogen
to give the complex (C).

Among non-aromatic dicarboxylic acid dihalides, the group consisting of maleic acid dihalide, fumaric acid dihalide and their R" substituted derivatives such as citraconic acid dihalide and mesaconic acid dihalide, respectively, are the most important.

Among the cyclic, preferably aromatic, dicarboxylic acid dihalides, the group consisting of phthalic acid dihalide (1,2-benzene dicarboxylic acid dihalide), its hydrogenate 1,2-cyclohexane dicarboxylic acid dihalide, and their derivatives, is the most important. Most preferably, said dicarboxylic acid dihalide is phthaloyl dichloride.

Preferably the magnesium compound is reacted with the dicarboxylic acid halide in a molar ratio $Mg_{total\ added}$/dicarboxylic acid halide of 1:1 and 1:0.1, preferably between 1:0.6 and 1:0.25.

Preferably the metal compound (CM) which is selected from one of the groups 1 to 3 of the periodic table (IUPAC), more preferably the metal compound of Group 2, even more preferably the magnesium compound, is reacted with the internal electron donor (ID) or with the internal electron donor precursor (P-ID), i.e. the dicarboxylic acid dihalide, under at least one of the following conditions:
  adding said dicarboxylic acid dihalide under room temperature and
  heating the obtained reaction mixture to a temperature of 20 to 80° C., preferably of 50 to 70° C.
  keeping the temperature for 10 to 90 min, preferably for 25 to 35 min.

The organic solvent used for the preparation of the complex (C) can be any organic solvent as long as it is ensured that the complex (C) is dissolved at ambient temperatures, i.e. at temperatures up to 80° C. (20 to 80° C.). Accordingly it is appreciated that the organic solvent comprises, preferably consists of, $C_5$ to $C_{10}$ hydrocarbon, more preferably of a $C_6$ to $C_{10}$ aromatic hydrocarbon, like toluene.

Suitable transition metal compounds (CT) are in particular transition metal compounds (CT) of transition metals of groups 4 to 6, in particular of group 4 or 5, of the periodic table (IUPAC). Suitable examples include Ti and V, in particular preferred is a compound of Ti, like $TiCl_4$.

In addition to the compounds described above, the solid catalyst system (SCS) can comprise e.g. reducing agents, like compounds of group 13, preferably Al-compounds containing alkyl and/or alkoxy residues, and optionally halogen residues. These compounds can be added into the solid catalyst system (SCS) preparation at any step before the final recovery.

The solid catalyst system (SCS) used in the invention may comprise in addition to the catalyst components conventional cocatalyst, e.g. those based on compounds of group 13 of the periodic table (IUPAC), e.g. organo aluminum, such as aluminum compounds, like aluminum alkyl, aluminum halide or aluminum alkyl halide compounds (e.g. triethylaluminum) compounds, can be mentioned.

Additionally one or more external donors can be used which may be typically selected e.g. from silanes or any other well known external donors in the field. External donors are known in the art and are used as stereoregulating agent in propylene polymerization. The external donors are preferably selected from diethylamino-triethoxy-silane (U-Donor), hydrocarbyloxy silane compounds and hydrocarbyloxy alkane compounds.

Typical hydrocarbyloxy silane compounds have the formula (II)

$$R'_oSi(OR'')_{4-o} \qquad (II)$$

wherein
R' is an a- or b-branched $C_3$ to $C_{12}$-hydrocarbyl,
R" a $C_1$ to $C_{12}$-hydrocarbyl, and
0 is an integer 1-3.

More specific examples of the hydrocarbyloxy silane compounds which are useful as external electron donors in the invention are diphenyldimethoxy silane, dicyclopentyldimethoxy silane (D-Donor), dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane (C-Donor), cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane. Most preferably, the organo silane compounds are diethylamino-triethoxy-silane (U-Donor), cyclohexylmethyl dimethoxy silane (C-Donor), or dicyclopentyl dimethoxy silane (D-Donor), the latter especially preferred.

After contacting the solution of the complex (C) with the liquid of the transition metal compound (CT) or the solution of the transition metal compound (CT) either the solid catalyst system (SCS) spontaneously precipitates or alternatively an emulsion is formed, the latter being preferred. Whether an emulsion is obtained or an immediate precipitation occurs depend on the specific conditions chosen. Reference is made inter alia to the International patent applications WO 03/000754, WO 03/000757, and WO 2007/077027 as well as to the European patent application EP 2 251 361. In the following the emulsion method is described in more detail.

Emulsion Method:

The solid catalyst system according to the emulsion method is obtained by
(a) preparing a solution of a complex (C) of a metal which is selected from one of the groups 1 to 3 of the periodic table (IUPAC) and an internal electron donor (ID), said complex (C) is obtained by reacting a compound (CM) of said metal with said internal electron donor (ID) or a precursor (P-ID) thereof in an organic solvent,
(b) mixing said solution of complex (C) with a liquid transition metal compound (CT), (c) obtaining thereby an emulsion of a continuous phase and an dispersed phase, said dispersed phase is in form of droplets and comprises the complex (C) and the transition metal compound (CT), (d) solidifying the droplets of the dispersed phase obtaining thereby the solid catalyst system (SCS).

Accordingly for the emulsion method the complex (C) is preferably dissolved in an $C_6$ to $C_{10}$ aromatic hydrocarbon, like toluene and contacted with a liquid transition metal compound (CT), preferably with a liquid transition metal compound (CT) of transition metals of groups 4 to 6, in particular of group 4, of the periodic table (IUPAC), like Ti (e.g. $TiCl_4$). Due to the contact of the solution of the complex (C) with the liquid transition metal compound (CT) an emulsion is formed. The production of a two-phase, i.e. of an emulsion, is encouraged by carrying out the contacting at low temperature, specifically above 10° C. but below 60° C., preferably between above 20° C. and below 50° C. The emulsion comprises a continuous phase and a dispersed phase in form of droplets. In the dispersed phase the complex (C) as well as the transition metal compound (CT) are present.

Additional catalyst components, like an aluminium compound, like aluminium alkyl, aluminium alkyl halide or aluminium alkoxy or aluminium alkoxy alkyl or halide or other compounds acting as reducing agents can be added to the reactions mixture at any step before the final recovery of the solid catalyst system. Further, during the preparation, any agents enhancing the emulsion formation can be added. As examples can be mentioned emulsifying agents or emulsion stabilisers e.g. surfactants, like acrylic or metacrylic polymer solutions and turbulence minimizing agents, like alpha-olefin polymers without polar groups, like polymers of alpha olefins of 6 to 20 carbon atoms.

Suitable processes for mixing the obtained emulsion include the use of mechanical as well as the use of ultrasound for mixing, as known to the skilled person. The process parameters, such as time of mixing, intensity of mixing, type of mixing, power employed for mixing, such as mixer velocity or wavelength of ultrasound employed, viscosity of solvent phase, additives employed, such as surfactants, etc. are used for adjusting the size of the solid catalyst system (SCS) particles.

Said solid catalyst system (SCS) particles may then be formed and recovered in usual manner, including the solidification of the catalyst particles by heating (for instance at a temperature of 70 to 150° C., more preferably at 90 to 110° C.) and separating steps (for recovering the catalyst particles). In this connection reference is made to the disclosure in the international applications WO 03/000754, WO 03/000757, WO 2007/077027, WO 2004/029112 and WO 2007/077027 disclosing suitable reaction conditions. This disclosure is incorporated herein by reference. The solid catalyst particles (SCS) obtained may furthermore be subjected to further post-processing steps, such as washing, stabilizing, pre-polymerization, prior to the final use in polymerisation process.

In a preferable embodiment of the preparation of the catalyst, the solid catalyst component is prepared by a process comprising: preparing a solution of magnesium complex by reacting an alkoxy magnesium compound and an electron donor or precursor thereof in a $C_6$-$C_{10}$ aromatic liquid reaction medium; reacting said magnesium complex with a compound of at least one four-valent Group 4 metal at a temperature greater than 10° C. and less than 60° C. to produce an emulsion of a denser, $TiCl_4$/toluene-insoluble, oil dispersed phase having, Group 4 metal/Mg mol ratio 0.1 to 10 in an oil disperse phase having Group 4 metal/Mg mol ratio 10 to 100; agitating the emulsion, optionally in the presence of an emulsion stabilizer and/or a turbulence minimizing agent, in order to maintain the droplets of said dispersed phase within an average size range of 5 to 200 μm. The catalyst particles are obtained after solidifying said particles of the dispersed phase by heating. In said process an aluminium alkyl compound of the formula $AlR_{3-n}X_n$, where R is an alkyl and/or an alkoxy group of 1 to 20, preferably of 1 to 10 carbon atoms, X is a halogen and n is 0, 1, 2 or 3, is added and brought into contact with the droplets of the dispersed phase of the agitated emulsion or during the washing step of the solidified particles before recovering the final solid particles. The aluminium alkyl compound is preferably trialkyl aluminium such as trimethylaluminium, triethylaluminium, tri-isobutylaluminium or tri-n-octylaluminium. However, it may also be an alkylaluminium halide, such as diethylaluminium chloride, dimethylaluminium chloride and ethylaluminium sesquichloride.

Typical examples used as external donors are dicyclopentyldimethoxysilane (DCPDMS), cyclohexylmethyl-dimethoxysilane (CHMDMS) and dicyclopentadienyldiethoxysilane (DCPDES).

In the following the present invention is further illustrated by means of examples.

EXAMPLES

A. Measuring Methods

The following definitions of terms and determination methods apply for the above general description of the invention as well as to the below examples unless otherwise defined. Calculation of comonomer content of the second propylene ethylene random copolymer fraction (R-PP2):

$$\frac{C(R2) - w(PP1) \times C(PP1)}{w(PP2)} = C(PP2)$$

wherein w(PP1) is the weight fraction of the propylene ethylene random copolymer fraction (R-PP1), i.e. the product of the first reactor (R1), based on the weight of R-PP;

w(PP2) is the weight fraction of the propylene ethylene random copolymer fraction (R-PP2), i.e. of the polymer produced in the second reactor (R2), based on the weight of R-PP C(PP1) is the comonomer content [in wt.-%] of the propylene ethylene random copolymer fraction (R-PP1), i.e. of the product of the first reactor (R1), C(R2) is the comonomer content [in wt.-%] of the product obtained in the second reactor (R2), i.e. the propylene ethylene random copolymer (R-PP), C(PP2) is the calculated comonomer content [in wt.-%] of the propylene ethylene random copolymer fraction (R-PP2).

Calculation of the xylene cold soluble (XCS) content of the propylene ethylene random copolymer fraction (R-PP2):

$$\frac{XS(R2) - w(PP1) \times XS(PP1)}{w(PP2)} = XS(PP2)$$

wherein w(PP1) is the weight fraction of the propylene ethylene random copolymer fraction (R-PP1), i.e. the product of the first reactor (R1), w(PP2) is the weight fraction of the propylene ethylene random copolymer fraction (R-PP2), i.e. of the polymer produced in the second reactor (R2), XS(PP1) is the xylene cold soluble (XCS) content [in wt.-%] of the propylene ethylene random copolymer fraction (R-PP1), i.e. of the product of the first reactor (R1), XS(R2) is the xylene cold soluble (XCS) content [in wt.-%] of the product obtained in the second reactor (R2), i.e. the propylene ethylene random copolymer (R-PP), XS(PP2) is the calculated xylene cold soluble (XCS) content [in wt.-%] of the propylene ethylene random copolymer fraction (R-PP2).

Calculation of melt flow rate $MFR_2$ (230° C.) of the propylene ethylene random copolymer fraction (R-PP2):

$$MFR(PP2) = 10^{\left[\frac{log(MFR(PP))-w(PP1)\times log(MFR(PP1))}{w(PP2)}\right]}$$

wherein w(PP1) is the weight fraction of the propylene ethylene random copolymer fraction (R-PP1), i.e. the product of the first reactor (R1), w(PP2) is the weight fraction of the propylene ethylene random copolymer fraction (R-PP2), i.e. of the polymer produced in the second reactor (R2), MFR(PP1) is the melt flow rate $MFR_2$ (230° C.) [in g/10 min] of the propylene ethylene random copolymer fraction (R-PP1), MFR(PP) is the melt flow rate $MFR_2$ (230° C.) [in g/10 min] of the product obtained in the second reactor (R2), i.e. the propylene ethylene random copolymer (R-PP), MFR(PP2) is the calculated melt flow rate $MFR_2$ (230° C.) [in g/10 min] of the propylene ethylene random copolymer fraction (R-PP2).

Density is measured according to ISO 1183-1—method A (2004). Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 2.16 kg load).

Ethylene content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

The xylene cold solubles (XCS, wt.-%): Content of xylene cold solubles (XCS) is determined at 25° C. according ISO 16152; first edition; 2005-07-01

Melting temperature Tm, crystallization temperature Tc: measured with Mettler TA820 differential scanning calorimetry (DSC) on 5 to 10 mg samples. DSC is run according to ISO 11357/part 3/method C2 in a heat/cool/heat cycle with a scan rate of 10° C./min in the temperature range of +23 to +210° C. Crystallization temperature and enthalpy are determined from the cooling step, while melting temperature and melting enthalpy are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Tensile test for film: ASTM D882

Flexural Modulus Test for Base Resin or Pellet Thereof:

ISO 178. The test specimens have a dimension of 80×10×4 0 mm$^3$ (length×width×thickness), and were prepared by injection molding according to EN ISO 1873-2. The length of the span between the supports was 64 mm, the test speed was 2 mm/min and the force was 100 N.

Heat seal temperature test for film: BICM90731 of Borouge/available from Borealis AG: Seal width 25 mm, seal pressure 43.5 psi; dwell time 1 s; SIT at 5N seal force.

Metallizability:
  the gloss of the surface of the metal layer of the metalized film is tested by using a gloss meter according to ISO2813.
  metal adhesion of the corona-treated layer of the metalized film to the deposited metal layer is tested by peeling the metal layer from the film at a speed of 500 mm/min., after conditioned at 80° C. for 2 h.
  surface tension decay of the corona-treated layer after corona treatment vs aging time is tested by using a corona pen at room temperature.

Coefficient of Friction (CoF)

The Coefficient of Friction (CoF) (including static CoF and dynamic CoF) as a measure of the frictional behavior of the film is determined using a method according to ISO 8295:1995 and ASTM D1894: 2008.

B. Examples

1. Preparation of a Propylene Ethylene Random Copolymer (R-PP) According to the Invention The catalyst used in the polymerization processes of the examples was the catalyst as prepared in Example 8 of WO 2004/029112A1 (see pages 22-23), except that diethylaluminium chloride was used as an aluminium compound instead of triethylaluminium.

An external donor, dicyclopentyldimethoxy silane, has been used. The ratio of aluminium to donor was 7.5. Polypropylene has been copolymerized with ethylene in a pilot bimodal multireactor system for polymerization mode consisting of a pre-polymerization, a loop reactor and a gas reactor, with a catalyst of the above-described system and under the following polymerization conditions (Table 1). Two copolymers of propylene and ethylene (Ex.1 and Ex.) are copolymerized and obtained. Technical features of the two copolymers obtained are listed in Table 2.

TABLE 1

Polymerization conditions of random copolymer of propylene

| | | Example | |
|---|---|---|---|
| | | Ex. 1 | Ex. 2 |
| Prepoly | Total prod (kg/h) | 60 | 60 |
| | Temperature (° C.) | 30 | 30 |
| | Pressure (bar) | 55 | 55 |
| | Donor (g/t) | 35 | 40 |
| | H2 feed (g/h) | 2.5 | 2.5 |
| | C2 feed (g/h) | 300 | 300 |

TABLE 1-continued

Polymerization conditions of random copolymer of propylene

| | | Example | |
|---|---|---|---|
| | | Ex. 1 | Ex. 2 |
| Loop Reactor | Temp (° C.) | 70 | 70 |
| | Prod (kg/h) | 25 | 25 |
| | Pressure (bar) | 55 | 55 |
| | C2-content (wt-%) | 2 | 3.4 |
| | C2/production rate (kg/t) | 22 | 38 |
| | C2 feed (g/h) | 350 | 600 |
| | H2/C3 in Loop (mol/kmol) | 4 | 4 |
| | MFR (230° C.) | 8 | 8 |
| Gas Reactor | C2/C3 (mol/kmol) | 14 | 28 |
| | C2-content (wt-%) | 2 | 4.2 |
| | H2/C3 (mol/kmol) | 40 | 42 |
| | MFR (230° C.) | 8 | 8 |
| | Temperature (° C.) | 85 | 85 |
| | Pressure (bar) | 21 | 21 |
| | Split (%) | 55 | 55 |

In Table 1, "H2/C3 (mol/kmol)" means the feed ratio of H2/C3, and "C2/C3 mol/kmol" means the feed ratio of C2/C3. The volume of pre-polymerization reactor is very small, and production rate is much less than that in loop reactor and gas reactor. In this case, R-PP1 means the sum of copolymers as produced in pre-polymerization reactor and loop reactor, and R-PP2 means the fraction as produced in gas reactor.

The technical features of the final copolymer product and two fractions (R-PP1 & R-PP2) as produced in different reactors are listed in Table 2. The "C2-content (wt-%)", "XS %" and "MFR" of 45% fraction (R-PP1) of final copolymer and final copolymer are obtained by directly testing the product of loop reactor and gas reactor (i.e. the last reactor). The "C2-content (wt-%)", "XS %" and "MFR" of 55% fraction (R-PP2) are obtained by calculation according to the calculation equation as listed in "measuring method" part.

TABLE 2

Technical features of the final copolymer and two fractions as produced in different reactor

| | | 45% fraction as produced in prepoly. reactor and LR | | 55% fraction produced in GR | | Final copolymer product | |
|---|---|---|---|---|---|---|---|
| | | Ex. 1 | Ex. 2 | Ex. 1 | Ex. 2 | Ex. 1 | Ex. 2 |
| C$_2$ | [wt.-%] | 2 | 3.4 | 2 | 4.9 | 2 | 4.2 |
| MFR$_2$ | [g/10 min] | 8.0 | 8.0 | 8.0 | 8.0 | 8.0 | 8.0 |
| XS | [wt.-%] | 3.5 | 5.0 | 3.5 | 8.6 | 3.5 | 7.0 |
| Tm (low) | [° C.] | | | | | 137 | 137 |
| Tm (high) | [° C.] | | | | | 149 | 146 |

After polymerization, the copolymer had been pelletized in an extruder. The formulation contained regular additives such as a normal acid scavenger (e.g. Ca stearate), antioxidants (e.g. Irganox 1010, Irgafos 168), and anti-blocking agents (e.g. synthetic silica) at a total amount of 0.45 wt %. Thus, two compositions E1 and E2 in pellet were formed from Ex.1 and Ex.2 respectively, with the same formulation except for different base resin.

2. Preparation of a Cast Film

The compositions E1 and E2 of propylene ethylene random copolymer (R-PP) obtained above, including the additives, have been extruded respectively in a cast machine to form a monolayer cast film with a thickness of 30 μm. Properties of the cast film are shown in Table 3.

Results:

The propylene ethylene random copolymer (R-PP) showed two Tms, thereby, cast films of E1 and E2 have two Tms as well, and thus have a better processability and a lower heat-sealing temperature due to presence of the lower Tm. Simultaneously, the cast film made from the propylene ethylene random copolymer (R-PP) had a slightly higher tensile modulus and tensile strength, better for the cast film for package material requiring a higher tensile property.

TABLE 3 properties of cast film of compositions E1 and E2

| Properties | | Film of E1 | Film of E2 |
|---|---|---|---|
| Base resin | [—] | Ex. 1 | Ex. 2 |
| Tm (low, ° C.) | [° C.] | 137 | 137 |
| Tm (high, ° C.) | [° C.] | 149 | 146 |
| Tensile modulus MD/TD | [MPa] | 705/732 | 480/469 |
| Tensile strength MD/TD | [MPa] | 49.6/33.8 | 53.5/40.3 |
| Flexural modulus of E1 and E2 | [MPa] | 900 | 900 |
| Heat sealing temperature range | [° C.] | 122-127 | 111-121 |

As a conclusion, it may be stated that the propylene ethylene random copolymers (R-PP) according to the invention provides for a highly advantageous processability and stiffness properties. Moreover the claimed propylene ethylene random copolymers (R-PP) according to the invention provides a broad heat seal temperature window.

Further Examples 3-8 were produced similarly to above example 1 and 2, but adapting the process conditions including feeds to obtain the polymer properties, MFR of loop, final MFR and C2 content as given in table 4. The Flexural modulus of the resin was measured as a mechanical property.

TABLE 4

Technical features of random copolymers of Ex. 3-8

| | | Example | | | | | |
|---|---|---|---|---|---|---|---|
| | | Ex. 3 | Ex. 4 | Ex. 5 | Ex. 6 | Ex. 7 | Ex. 8 |
| MFR$_2$ (230° C.) | [g/10 min] | 7.2 | 7.2 | 8.3 | 7.2 | 7.6 | 7.2 |
| Average on spot C2 | [%] | 2.3 | 2.16 | 6.3 | 8.2 | 3.8 | 3.9 |
| Xs pellets | [%] | 2.9 | 2.74 | 2.9 | 7.1 | 6.3 | 6.6 |
| Tm of PP (low) | [° C.] | 137.0 | 137.2 | 137.5 | 140.8 | 139.3 | 140.1 |
| Tm of PP (high) | [° C.] | 150.4 | 150.7 | 151.5 | 146.3 | 145.7 | 146.0 |

TABLE 4-continued

Technical features of random copolymers of Ex. 3-8

| | | Example | | | | | |
|---|---|---|---|---|---|---|---|
| | | Ex. 3 | Ex. 4 | Ex. 5 | Ex. 6 | Ex. 7 | Ex. 8 |
| Tc of PP | [° C.] | 105.7 | 105.85 | 109.4 | 102.1 | 97.6 | 96.7 |
| Flexural Modulus (24 h) | [MPa] | 1179 | 1259 | 1260 | 830 | 777 | 795 |

Random copolymers of Examples 3 to 8 were used for preparing cast films or metallizable films.

3. Preparation of a Polypropylene Composition for the Metallizable Films

The propylene ethylene random copolymer (R-PP) obtained under (1) has been pelletized together with a HDPE in an extruder. The formulation contained regular additives such as a normal acid scavenger (e.g. SHT), antioxidants (e.g. Irganox 1010 and Irgafos 168) and anti-blocking agents (e.g. synthetic zeolite), but being free of slip agent(s), at a total amount of 0.33 wt % or 0.43 wt %. Thus, two compositions E3 and E4 in pellet were formed from base resin Ex.1 and Ex.2 respectively, with the same formulation except for different base resin and slightly different level thereof, as shown in Table 5.

TABLE 5

Formulation of Compositions E3 and E4

| | | Composition: | |
|---|---|---|---|
| | | E3 | E4 |
| Ex. 1 | [wt.-%] | 95.67 | 0 |
| Ex. 2 | [wt.-%] | 0 | 95.57 |
| HDPE | [wt.-%] | 4 | 4 |
| Antioxidants, acid scavenger, antiblocking agent | [wt.-%] | 0.33 | 0.43 |

HDPE is the commercial high density polyethylene MG9061 of Borealis AG having $MFR_2$ (190° C.) of 30 g/10 min and a density of 960 kg/m³.

4. Preparation of a Metallizable Film

The compositions E3 and E4 of propylene ethylene random copolymer (R-PP) in pellet obtained under (3), were co-extruded together with a propylene homopolymer HD601CF of Borealis AG in a cast machine to form a cast film with a thickness of 30 μm and having three-layers, in which homo-PP resin (HD601CF) forms a core layer (21 μm thickness) sandwiched between a skin layer formed by E3 (4.5 μm thickness) and a heat-sealing layer formed by E4 (4.5 μm thickness).

The outer surface of the skin layer opposite to the core layer is treated by corona discharge, and then aluminium vapour is deposited on this corona-treated surface to form an aluminium metal layer.

Results:

The three-layer metallized cast film thus obtained (named as "inventive film" in Table 6) provides for a comparable metallizability with the prior product "FL7320/HD601CF/FL7641" (a three-layer metalized cast film commercially available from Polyolefin Company Ptd Ltd, Singapore, named as "comparative film" in Table 6). The prior product has the same thickness for each layer as the inventive film. Test results of the gloss and surface tension decay of inventive film are equal or very close to the latter, and metal adhesion is better than the latter, as shown in Table 6. The surface tension decay of the outer surface of the skin layer is plotted and shown in FIG. 1.

In table 6, the gloss is the gloss value of the outer surface of the metal layer of the metalized cast film. The metal adhesion means the adhesion of the outer surface of the skin layer of the cast film to the deposited aluminium layer. The surface tension decay means the surface tension decay of the outer surface of the skin layer of the cast film after the corona treatment but before the deposition of aluminium vapor.

Figure 1:
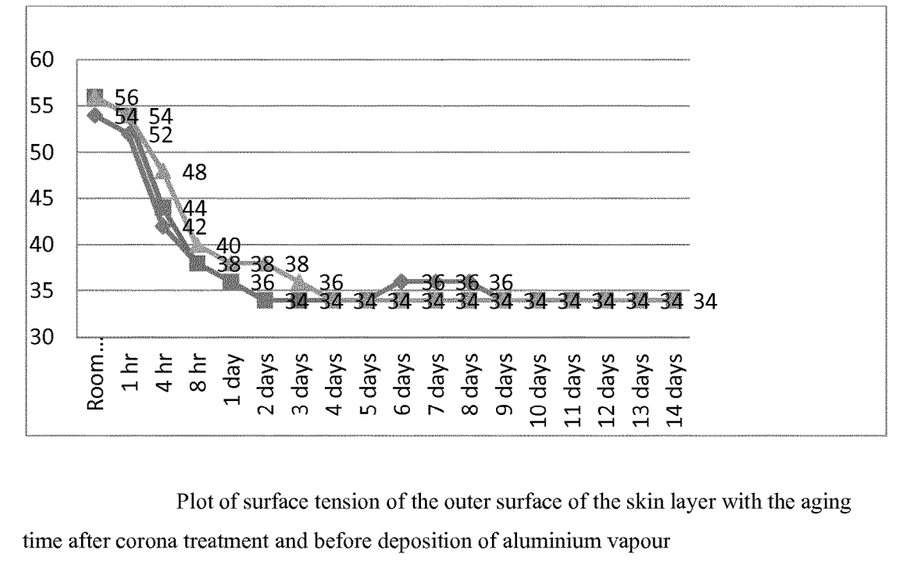
FIG. 1 is a chart depicting surface tension of the outer surface of the three-layer metallized films of examples E3 and E4 and the monolayer cast film of example E3.

In FIG. 1, the plot of "■" in red is for the inventive film, the plot of "▲" in green is for the comparative film, and the plot of "♦" in blue is for a monolayer cast film of composition E3 with a thickness of 30 μm.

Further, the inventive film has a low COF of equal to or less than "0.7" for the heat-sealing layer without addition of any slip agent. In the cast film industry, the desired COF is 0.6. So, the COF of inventive film is very close to the desired value.

In addition, the inventive compositions are easy to be processed into a cast film due to bimodal characteristics, and the cast film thus obtained has a higher tensile modulus and tensile strength than the prior product together with a relatively lower cost in production. The prior product uses a terpolymer of propylene, ethylene and butene.

TABLE 6

Properties of the metallized films

| Properties | | Inventive film | Comparative film |
|---|---|---|---|
| Gloss (60°) | [—] | 137 | 138 |
| Metal adhesion | [—] | 1 strip/3 pt | 3 strips/1 pt |
| Static COF | [—] | 0.7 | |
| Dynamic COF | [—] | 0.68 | |
| Tensile modulus MD/TD | [MPa] | 932/916 | 876/875 |
| Tensile strength MD/TD | [MPa] | 55.9/37.1 | 51.5/32.3 |

HD601CF is a commercial homo-polypropylene film resin, from Borealis which has a Melt Flow Rate (230° C./2.16 kg) of 8 g/10 min (ISO 1133) and a melting temperature (DSC) of 162° C. (ISO 11357-3)

HDPE is a commercial high density polyethylene (HDPE) "MG9601" of Borealis which has a MFR (190° C./2.16 kg) of 30 g/10 min and a density of 960 kg/m³

Hence, the film prepared by the invention grades possesses a comparable metallizability with the prior product, a low coefficient of friction (COF) without slip agent, and further an improved machinability and processability. In addition, the film has a better mechanical property (such as a higher stiffness) than the prior product, together with a lower cost in production.

What is claimed is:

1. A propylene ethylene random copolymer (R-PP), comprising a propylene ethylene random copolymer fraction (R-PP1) and a propylene ethylene random copolymer fraction (R-PP2) in a weight ratio [(R-PP1)/(R-PP2)] of 30/70 to 70/30 and not comprising an elastomeric phase,
   wherein the propylene ethylene random copolymer has
   (a) a melt flow rate MFR2 (230° C.) measured according to ISO 1133 from 5 to 15 g/10 min,
   (b) an ethylene content from 1 to 10 wt.-%, based on the weight of the propylene ethylene random copolymer (R-PP), and
   (c) exhibiting two melting temperatures ($T_m$) determined by differential scanning calorimetry (DSC) according to ISO 11357-3 which differ from each other,
   wherein a xylene cold soluble (XCS) content of the propylene ethylene random copolymer (R-PP) is equal or below 12 wt.-%, and
   (d) the ethylene content of the propylene ethylene random copolymer fraction (R-PP1) is equal to or differs from the ethylene content of the propylene ethylene random copolymer fraction (R-PP2).

2. The propylene ethylene random copolymer (R-PP) according to claim 1, wherein the two melting temperatures (Tm) differ from each other by at least 4° C.

3. The propylene ethylene random copolymer (R-PP) according to claim 1, wherein the higher melting temperature (Tm) ranges from 142 to 165° C., and the lower melting temperature (Tm) ranges from 125 to below 141° C.

4. The propylene ethylene random copolymer (R-PP) according to claim 1, wherein
   (d) the ethylene content of the propylene ethylene random copolymer fraction (R-PP1) differs from the ethylene content of the propylene ethylene random copolymer fraction (R-PP2) by 0-5 wt.-%.

5. The propylene ethylene random copolymer (R-PP) according to claim 1, wherein
   (e) the propylene ethylene random copolymer fraction (R-PP1) has an ethylene content of 1 to 8 wt.-%, and
   (f) the propylene ethylene random copolymer fraction (R-PP2) has an ethylene content of 1 to 10 wt.-%.

6. The propylene ethylene random copolymer (R-PP) according to claim 1, wherein $MFR_2$ (230° C.) of R-PP1 is equal to or differs from $MFR_2$ (230° C.) of R-PP2 by 0.1-3.0 g/10 min.

7. The propylene ethylene random copolymer (R-PP) according to claim 1, wherein the propylene ethylene random copolymer (R-PP) is non-visbroken.

8. The propylene ethylene random copolymer (R-PP) according to claim 1, obtainable by a sequential polymerization process comprising at least two reactors connected in series,
   wherein said process comprises the steps of
   (A) polymerizing in a first reactor (R-1) propylene and ethylene, and
   obtaining said propylene ethylene random copolymer fraction (R-PP1),
   (B) transferring said propylene ethylene random copolymer fraction (R-PP1) and unreacted comonomers from the first reactor into a second reactor (R-2),
   (C) feeding to said second reactor (R-2) propylene and ethylene,
   (D) polymerizing propylene and ethylene in said second reactor (R-2) and in the presence of said propylene ethylene random copolymer fraction (R-PP1), and
   obtaining said propylene ethylene random copolymer fraction (R-PP2), i.e. said propylene ethylene random copolymer (R-PP) comprising the propylene ethylene random copolymer fraction (R-PP1) and propylene ethylene random copolymer fraction (R-PP2),
   wherein further
   (i) the temperature in the first reactor (R-1) is of more than 65° C. to equal or below 95° C.,
   (ii) the temperature in the second reactor (R-2) is preferably of equal or more than 75° C. to equal or below 100° C.,
   (iii) in the first reactor (R-1) and second reactor (R-2) the polymerization takes place in the presence of a solid catalyst system (SCS) having a surface area measured according to ASTM D 3662 of less than 30 m²/g,
   wherein further
   (I) said solid catalyst system (SCS) comprises
   (Ia) a transition metal selected from one of the groups 4 to 6 of the periodic table (IUPAC),
   (Ib) a metal which is selected from one of the groups 1 to 3 of the periodic table (IUPAC), and
   (Ic) an internal electron donor (ID).

9. The propylene ethylene random copolymer (R-PP) according to claim 1, wherein the propylene ethylene random copolymer is suitable for the preparation of cast films.

10. The propylene ethylene random copolymer (R-PP) according to claim 1, wherein the propylene ethylene random copolymer is suitable for the preparation of metallizable films.

11. A polypropylene composition comprising:
   (a) 99 to 90 wt-% of a propylene ethylene random copolymer (R-PP),
   (b) 1 to 10 wt-% of a high density polyethylene (HDPE) having a melt flow rate MFR2 (190° C.) of 15 to 45 g/10 min and a density of at least 940 kg/m³,
   (c) optionally additives, such as acid scavengers, antioxidants and/or antiblocking agents;
   based on the total weight of the composition,
   wherein the propylene ethylene random copolymer (R-PP) comprises a propylene ethylene random copolymer fraction (R-PP1) and a propylene ethylene random copolymer fraction (R-PP2) in a weight ratio [(R-PP1)/(R-PP2)] of 30/70 to 70/30 and does not comprise an elastomeric phase, and
   wherein the propylene ethylene random copolymer has
   (a) a melt flow rate MFR2 (230° C.) measured according to ISO 1133 from 5 to 15 g/10 min,
   (b) an ethylene content from 1 to 10 wt.-%, based on the weight of the propylene ethylene random copolymer (R-PP), and
   (c) exhibiting two melting temperatures ($T_m$) determined by differential scanning calorimetry (DSC) according to ISO 11357-3 which differ from each other,
   wherein a xylene cold soluble (XCS) content of the propylene ethylene random copolymer (R-PP) is equal or below 12 wt.-%, and
   (d) the ethylene content of the propylene ethylene random copolymer fraction (R-PP1) is equal to or differs from the ethylene content of the propylene ethylene random copolymer fraction (R-PP2).

12. The polypropylene composition according to claim 11, being free of slip agent(s).

13. A cast film comprising the random propylene copolymer (R-PP) according to claim 1.

14. A metallizable film comprising the polypropylene composition according to claim 11.

15. A metallizable film according to claim 14, further comprising a skin layer, a core layer, and a heat-sealing layer, the core layer is sandwiched between the skin layer and the heat-sealing layer, wherein the polypropylene composition is used for the skin layer.

16. The propylene ethylene random copolymer (R-PP) according to claim 1, suitable in the preparation of polypropylene compositions suitable for the preparation of cast films and/or metallizable cast films.

17. The propylene ethylene random copolymer (R-PP) according to claim 16, wherein the cast films or metallizable cast films are monolayer films, bilayer films, triple layer films or multilayer films.

18. A process for the preparation of a propylene ethylene random copolymer (R-PP) comprising a propylene ethylene random copolymer fraction (R-PP1) and a propylene ethylene random copolymer fraction (R-PP2), said process is a sequential polymerization process comprising at least two reactors connected in series, wherein said process comprises the steps of
(A) polymerizing in a first reactor (R-1) propylene and ethylene, and
obtaining said propylene ethylene random copolymer fraction (R-PP1),
(B) transferring said propylene ethylene random copolymer fraction (R-PP1) and unreacted comonomers from the first reactor into a second reactor (R-2),
(C) feeding to said second reactor (R-2) propylene and ethylene,
(D) polymerizing propylene and ethylene in said second reactor (R-2) and in the presence of said propylene ethylene random copolymer fraction (R-PP1), and
obtaining said propylene ethylene random copolymer fraction (R-PP2), i.e. said propylene ethylene random copolymer (R-PP) comprising the propylene ethylene random copolymer fraction (R-PP1) and propylene ethylene random copolymer fraction (R-PP2),
wherein further
(i) the temperature in the first reactor (R-1) is of more than 65° C. to equal or below 95° C.,
(ii) the temperature in the second reactor (R-2) is of equal or more than 75° C. to equal or below 100° C.,
(iii) in the first reactor (R-1) and second reactor (R-2) the polymerization takes place in the presence of a solid catalyst system (SCS) having a surface area measured according to ASTM D 3662 of less than 30 m²/g,
wherein further
(I) said solid catalyst system (SCS) comprises
(Ia) a transition metal selected from one of the groups 4 to 6 of the periodic table (IUPAC),
(Ib) a metal which is selected from one of the groups 1 to 3 of the periodic table (IUPAC), and
(Ic) an internal electron donor (ID),
and
(II) said propylene copolymer (R-PP) comprises a propylene ethylene random copolymer fraction (R-PP1) and a propylene ethylene random copolymer fraction (R-PP2) in a weight ratio [(R-PP1)/(R-PP2)] of 30/70 to 70/30 and does not comprise an elastomeric phase, and
wherein the propylene ethylene random copolymer
(IIa) has a melt flow rate MFR2 (230° C.) measured according to ISO 1133 from 5 to 15 g/10 min,
(IIb) has an ethylene content from 1 to 10 wt.-% and
(IIc) exhibits two melting temperatures ($T_m$) determined by differential scanning calorimetry (DSC) according to ISO 11357-3 which differ from each other,
wherein a xylene cold soluble (XCS) content of the propylene ethylene random copolymer (R-PP) is equal or below 12 wt.-%, and
(IId) the ethylene content of the propylene ethylene random copolymer fraction (R-PP1) is equal to or differs from the ethylene content of the propylene ethylene random copolymer fraction (R-PP2).

* * * * *